United States Patent [19]

Strong

[11] 4,138,009

[45] Feb. 6, 1979

[54] ENDLESS BELT PARTS TRANSPORTER

[75] Inventor: Steven L. Strong, Lapeer, Mich.

[73] Assignee: General Motors Corporation, Detroit, Mich.

[21] Appl. No.: 827,266

[22] Filed: Aug. 24, 1977

[51] Int. Cl.² ............................................. B65G 47/24
[52] U.S. Cl. .................................. 198/396; 198/393; 198/778; 221/160
[58] Field of Search ............... 198/396, 397, 399, 778, 198/792, 393; 221/157, 159, 160, 161, 162, 171, 172

[56] References Cited

U.S. PATENT DOCUMENTS

| | | | |
|---|---|---|---|
| 3,640,373 | 2/1972 | Seragnoli | 198/392 |
| 3,655,028 | 4/1972 | Hodgins | 221/157 X |
| 3,857,476 | 12/1974 | Heifetz | 198/778 |

Primary Examiner—Robert B. Reeves
Assistant Examiner—Douglas D. Watts
Attorney, Agent, or Firm—Edward J. Biskup

[57] ABSTRACT

A material handling apparatus for transporting parts having a bowl provided with an upright curved wall surrounding a rotatable floor. The curved wall is formed with a track that supports an endless belt capable of bending in an edgewise direction for movement along a helical path from an entrance point located at the level of the floor to an exit point located above the entrance point. As the belt moves along the track, it gradually inclines towards the center of the bowl with a portion of the belt being sufficiently inclined to cause parts to move into engagement with a rail located at the inboard edge of the track and formed so that parts not properly oriented will drop by gravity to the rotating floor.

2 Claims, 6 Drawing Figures

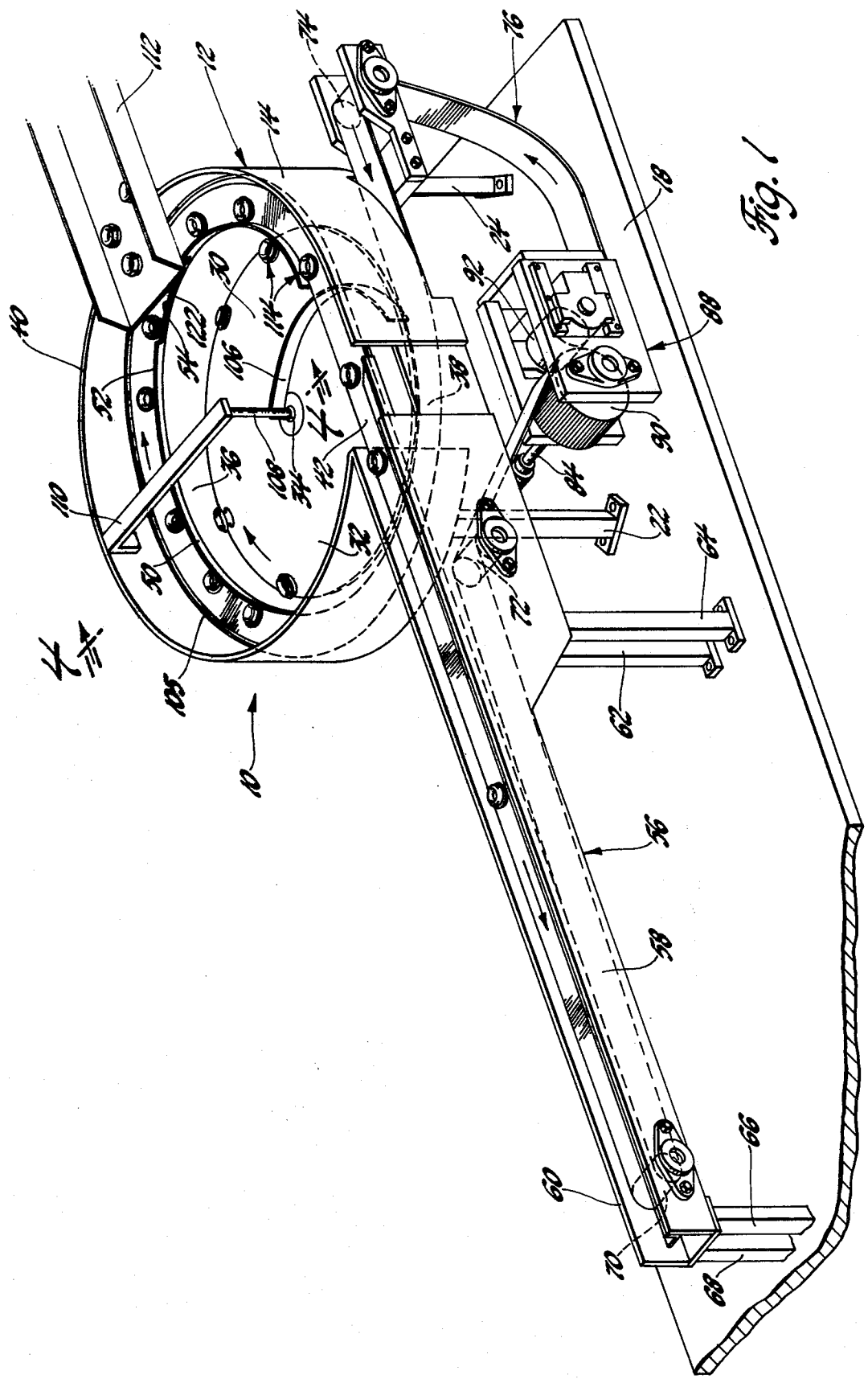

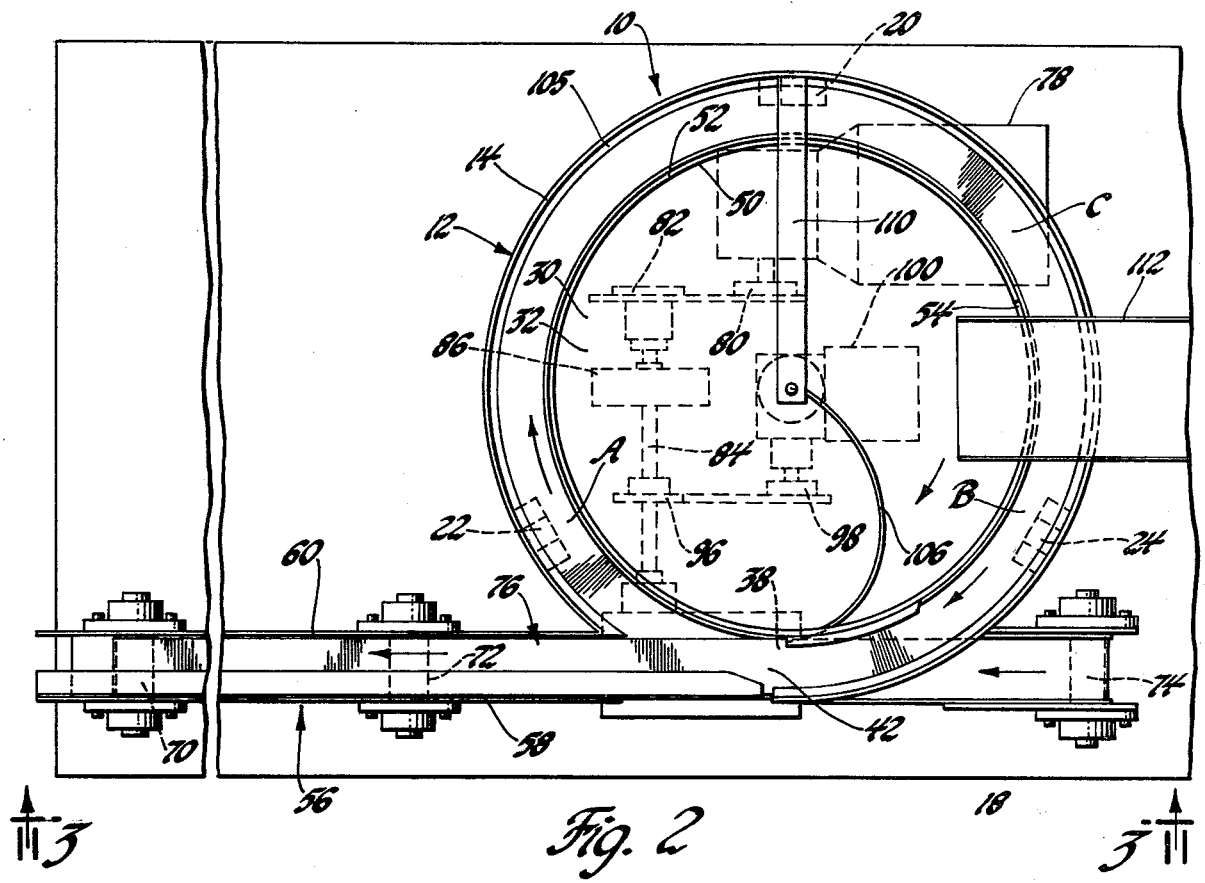

ENDLESS BELT PARTS TRANSPORTER

This invention concerns a material handling system in general and more particularly pertains to a feeder bowl transporting system having a chain-link type belt for conveying identical parts in proper orientation from one station to another for assembly with another part or for further processing at a work station.

More specifically, this invention contemplates a material handling apparatus for transporting parts that includes a bowl having an upright curved main wall circumferentially surrounding a rotatable floor. The curved wall has an entrance point for parts located at substantially the same elevation as the floor portion and an exit point for the parts located at an elevation higher than the floor. A track having an outer edge and an inner edge is formed along the concave surface of the curved wall for supporting an endless belt composed of a plurality of links collapsibly interconnected to allow the belt to bend in an edgewise direction. The track supports the belt for helical movement from the entrance point to the exit point of the curved wall. A sweep member is carried by the bowl and cooperates with the floor as the latter rotates for feeding the parts one at a time onto the belt at the entrance point. In addition, an upstanding rail is connected to the inner edge of the track and a portion of the track is inclined radially downwardly towards the center of the bowl so as to cause the parts carried by the belt to move by gravity towards and engage the rail as they are moved from the entrance to the exit point. An opening is formed in the rail along the inclined portion of the track that causes improperly oriented parts to drop by gravity to the rotating floor so as to be fed once again onto the belt at the entrance point.

The objects of the present invention are to provide a new and improved transporting system for parts that include a bowl having a chain-link type conveyor belt which has a portion thereof inclined radially downwardly towards the center of the bowl so as to cause improperly oriented parts to drop by gravity into the bowl and to be fed once again onto the belt; to provide a new and improved material handling apparatus that takes the form of a bowl having a rotatable floor for receiving and feeding parts onto a belt that moves in a helical path starting at the level of the floor and exiting from the bowl at an elevated point; to provide a new and improved parts transporter that has a cylindrical upstanding wall provided with a track for surrounding and supporting a chain-link belt for helical movement from an entrance point located along a lower portion of the wall to an exit point located along an upper portion of the wall and having a predetermined length of the track banked radially towards the center of the bowl so as to cause improperly oriented parts carried by the belt to fall by gravity into a pile of randomly positioned parts for refeeding onto the belt; and to provide a new and improved rotary belt parts feeder that takes the form of a bowl provided with a rotating floor that is conically shaped in cross section and having an endless chain-link belt that is driven in a spiral path along the inner wall of the bowl for moving parts from a lower entrance point to an elevated exit point.

Other objects and advantages of the present invention will be more apparent from the following detailed description when taken with the drawings in which:

FIG. 1 is a perspective view showing an endless belt parts transporter made in accordance with the invention;

FIG. 2 is a plan view showing the endless belt parts transporter of FIG. 1;

FIG. 3 is a side elevational view taken on lines 3—3 of FIG. 2;

Figure 4:
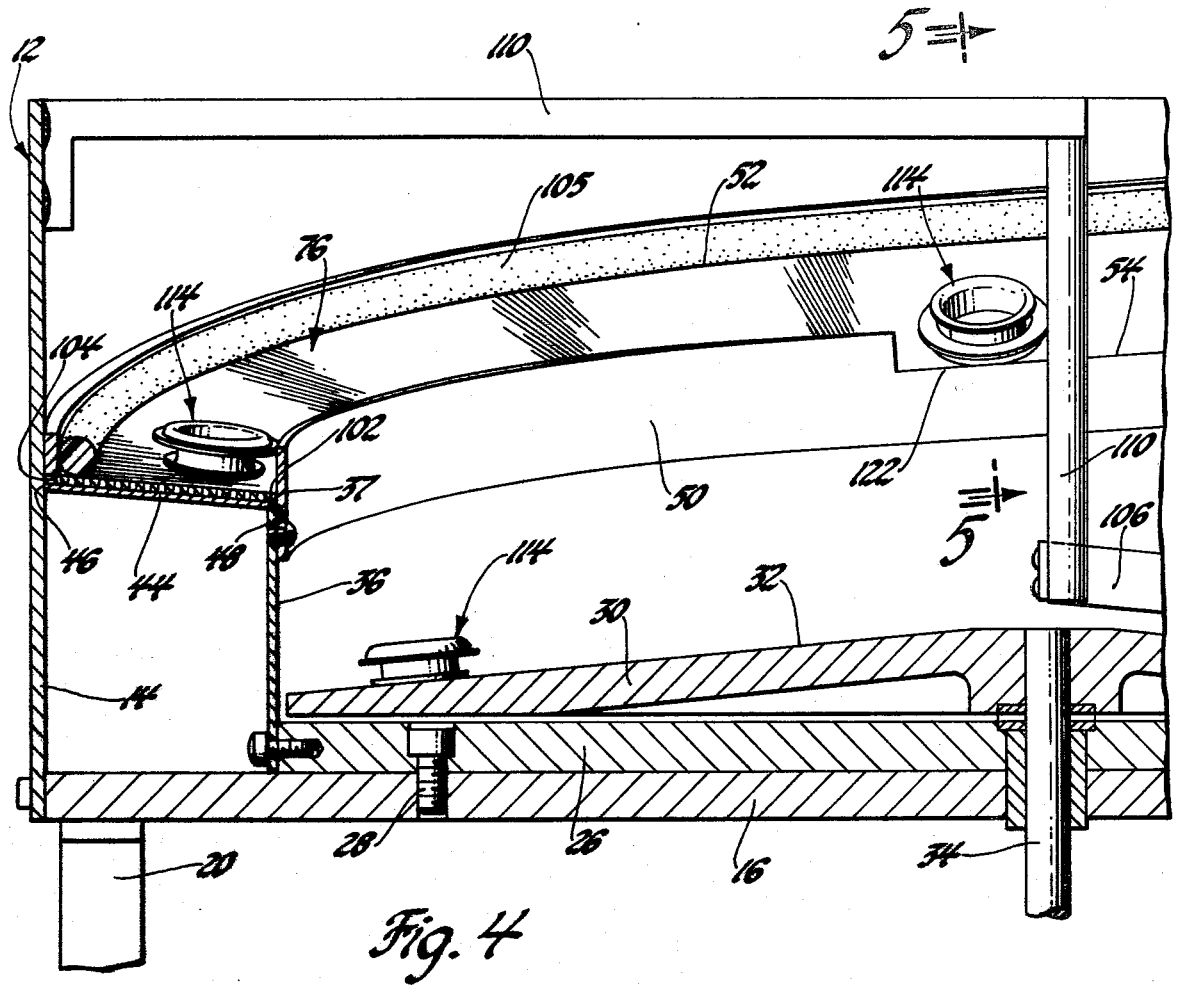
FIG. 4 is an enlarged sectional view taken on lines 4—4 of FIG. 1.

Referring to the drawings and more particularly FIGS. 1, 2 and 3 thereof, a material handling apparatus 10 made in accordance with the invention is shown comprising a bowl 12 having an upright curved circular wall 14, the lower end of which is fixed to the periphery of a horizontal base member 16 that takes the form of a disk. The bowl 12 is supported on a floor 18 by three vertical legs 20, 22, 24 which as seen in FIG. 2 are uniformly circumferentially spaced from each other. A circular plate member 26 having a diameter less than the diameter of the base member 16 is concentrically mounted to the base member 16 by a plurality of bolts, one of which is shown in FIG. 4 and identified by the reference numeral 28. Located above the plate member 26 is a circular floor member 30 which is conical in shape at its upper surface 32 when viewed in cross section and is rigidly connected to the upper end of a rotatable shaft 34 that extends vertically through the plate member 26 and the base member 16. The shaft 34 serves to rotate the floor member 30 relative to the plate member 26 and the base member 16.

A secondary upright circular inner wall 36 is positioned within the bowl concentric to the wall 14 and has the upper edge 37 thereof starting at the entrance point 38 of the bowl at the level of the outer peripheral edge of the floor member 30. The secondary wall 36 starts at the entrance point 38 of the bowl 12 and, as seen in FIG. 3, gradually spirals upwards until it reaches the upper edge 40 of the wall 14 of the bowl 12 at the exit point 42 which is directly above the entrance point 38. The upper edge 37 of the inner wall 36 fixedly supports a guide or track member 44 made of flat sheet metal that starts at the entrance point 38 and spirals upwardly to the exit point 42 of the bowl 12 and has an outer edge 46 located adjacent the outer wall 14 and an inner edge 48 fixed with the upper edge 37 of the inner wall 36. As seen in FIG. 2 and beginning at a point of the track member 44 indicated by letter A and proceeding clockwise therealong to a point of the track member 44 indicated by the letter B, the track member 44, when viewed in cross section, is inclined radially downwardly towards the rotational center axis of the shaft 34 supporting the floor member 30. The inclination of the track member 44 gradually increases from the point A until it reaches a maximum inclination at point C and then it gradually returns to a horizontal attitude as it moves beyond point B to the exit point 42 of the bowl 12. The inner wall 36 is also formed with a rail 50 which is fixed to the inner wall 36 and has its upper edge 52 extending above the track member 44 a uniform distance along the latter mentioned wall. The rail 50 has a cutout portion 54 formed therein for a purpose which will be explained hereinafter.

An extension device 56 is connected to the curved track member 44 at the exit point 42 of the bowl 12 and consists of a pair of vertically oriented and laterally spaced side walls 58 and 60 supported by a plurality of legs 62–68 which rest on the floor 18. Between the side walls 58 and 60 is a horizontal guide or track member (not shown) having a width identical to the width of the track member 44 in the bowl 12. The track member of the extension device 56 meets the track member 44 at a tangent and can be considered to be a straight horizontal extension thereof. In addition, the extension device 56 is provided with a pair of rollers 70 and 72 supported between the side walls 58 and 60. A roller 74 which is similar to the rollers 70 and 72 of the extension device 56 is supported by the bowl 12 and located in line with the extension device but on the opposite side of the entrance point as seen in FIGS. 1 and 3. All of the rollers 70–74 are supported for rotation about parallel horizontal axes.

Both the track member 44 in the bowl and the track member of the extension device 56 serve to support an endless chain-link belt 76 as the latter is driven around the bowl 12 from the entrance point 38 to the exit point 42 and then along and to the end of the extension device 56. In this connection, it will be noted that beneath the bowl 12 a drive mechanism is provided for driving the belt 76 and simultaneously rotating the floor member 30. The drive mechanism comprises an electric motor 78, the output shaft of which is drivingly connected to a sprocket wheel 80. The sprocket wheel 80, acting through a chain, drives a sprocket wheel 82 which is rigidly connected to one end of a shaft 84 that is rotatably supported by a pillow block 86. The other end of the shaft 84 provides drive to a belt drive unit 88 which includes a pair of rollers 90 and 92 between which the belt 76 extends. The rollers 90 and 92 each have the outer periphery thereof formed with a friction material for driving the belt 76. It will be noted that the roller 92 forms a part of a take-up unit which includes a spring 94 for continuously urging the roller 92 towards the roller 90. It will also be noted that an intermediate portion of the shaft 84 has a sprocket wheel 96 fixed thereto which is drivingly connected by a chain to a sprocket wheel 98 which forms a part of a right angle drive unit 100 that transmit rotational drive to the shaft 34 supporting the floor member 30.

From the above description, it should be apparent that a portion of the belt 76 is located at all times along the track member 44 of the bowl and the track member of the extension device 56. The aforementioned inclination of the track member 44 in the bowl 12 permits the inner edge 102 of the belt 76 to engage the rail 50 and provide a self-supporting effect so that no holddown means is required at this point. As to the outer edge 104 of the belt 76, a resilient tubular member 105 is provided that is fastened to the outer wall 14 of the bowl 12. The remaining portion of the belt 76 winds around the rollers 70, 72 and 74 as seen in FIGS. 1 and 3, and passes between the rollers 90, 92 of the belt drive unit 88. Thus, when the electric motor 78 is energized, the shaft 84 and accordingly the attached roller 90 is driven in a clockwise direction as seen in FIG. 3. This causes the belt 76 to be moved in the direction of the arrows with the portion of the belt 76 located to the left of the roller, as seen in FIG. 3, being in tension. While the belt 76 moves in the direction of the arrows, the floor member 30 is simultaneously driven in a clockwise direction as seen in FIGS. 1 and 2 through the sprocket wheels 96, 98 and the right angle drive unit 100.

At this juncture, it should be noted that the belt 76 used with this invention is known as a "balanced weave" belt design having a specification B-144-105-20/22 and can be obtained from Wiremation Industries, Inc. of Lancaster, Pennsylvania. The belt 76 is a metal conveyor belt having alternating right and left hand spirals joined by crimped connecting rods. In addition, the belt 76 provides edgewise bending so it can travel in the circle provided by the track member 44 in the bowl. It will also be noted that the bowl 12 is provided with a sweep member 106 which consists of a thin flexible plastic arm that has one end fixed with a vertical rod 108 supported vertically above the center of the shaft 34 by a bar 110 secured to the wall 14 of the bowl 12. The sweep member 106 extends radially outwardly in a curved form from the center of the bowl 12 towards the outer edge of the floor member 30 and is normally positioned adjacent the entrance point 38 of the bowl 12.

Figure 5:
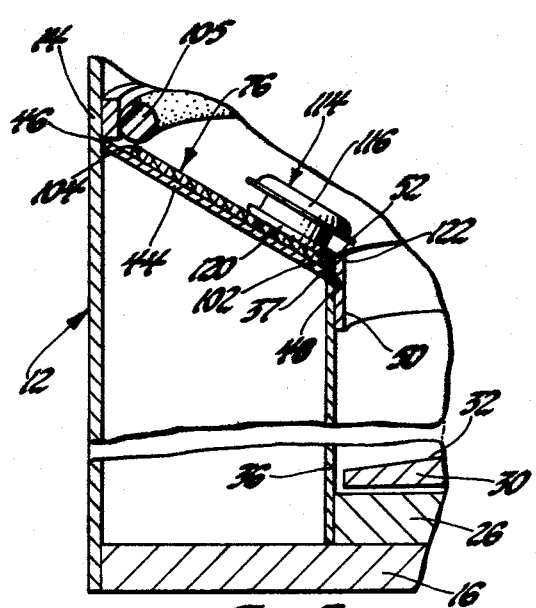
FIG. 5 is a sectional view taken on lines 5—5 of FIG. 4.

The operation of the apparatus described above is as follows:

As seen in FIGS. 1, 2 and 3, a parts chute 112 is located above the bowl 12 of the apparatus 10 and serves to deposit onto the floor member 30 identical spacer parts that form a part of a motor vehicle oil filter element. As seen in FIG. 5, the spacer part is identified by the reference numeral 114, and comprises a hat-shaped head 116 integrally formed with a cylindrical body portion 118 that has a radially outwardly extending thin flange 120 circumferentially surrounding the body portion 118. The parts 114 are intended to be assembled into the oil filter element by an automatic machine (not shown) which requires the parts 114 to be fed to it one at a time in proper orientation which in this case is with the part resting on the flange 120 as seen in FIG. 5.

Figure 6:
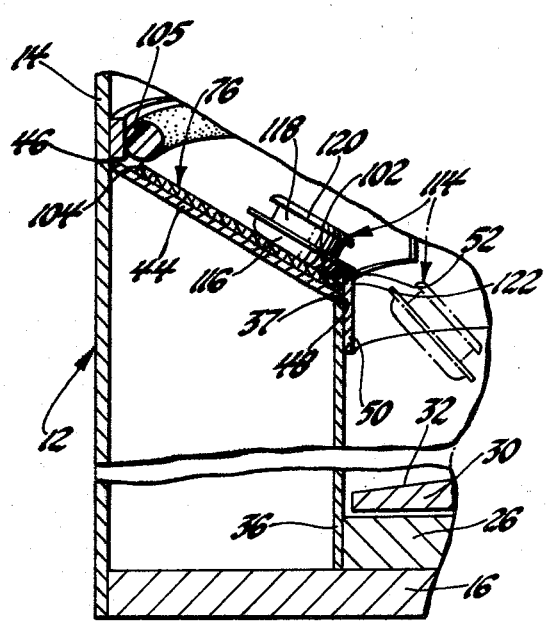
FIG. 6 is a view similar to FIG. 5 with a part improperly oriented and dropping by gravity towards the floor portion of the bowl.

As should be apparent, when the parts 114 drop from the chute 112 onto the floor member 30 they will assume proper orientation, in other words, rest on the flange 120, or improper orientation which has the part resting on the head 116 as seen in FIG. 6. The rotating floor member 30 then moves the parts 114 towards the sweep member 106 which cooperates with the inner wall 36 for allowing one part at a time to move onto the belt 76 at the entrance point 38 of the bowl 12. The belt 76 then carries the individual parts 114 upwardly along the track member 44 towards the exit point 42 of the bowl 12. As the parts 114 are moved by the belt 76 upwardly along the track member 44, the gradual increase in inclination of the track member 44, as alluded to hereinbefore, causes each part to move radially inwardly towards and into engagement with the rail 50.

The upper edge of the rail 50 is designed so that it prevents the parts 114 from dropping into the center of the bowl 12 if they are properly oriented. If, however, a part 114 is resting on the head 116 rather than the flange 120, the part drops from the belt 76 by gravity onto the floor member 30 and, in effect, is rejected by the apparatus 10. In this regard, it will be noted that the cutout portion 54 in the rail 50 serves to remove the improperly positioned parts 114 from the belt 76. The cutout portion 54 causes the rail 50 at this location to have a ledge 122 which is high enough to be engaged by the flange 120 and cause the part to be retained on the belt, but not high enough to support the part 114 when the latter is resting on its head 116. This is accomplished by a combination of the inclination of the belt 76 at the cutout portion area and the design of the part 114. Thus, as seen in FIG. 5, the part 114 will be supported by the ledge 122 with the flange 120 resting on the belt 76, but will drop from the belt 76 as seen in FIG. 6 when positioned on its head 116. The latter occurs in this instance due to the design of the head 116. It will be noted that in the position of FIG. 6, a rounded portion of the head 116 contacts the ledge 122 and because of the inclination of the belt permits the part 114 to slip over the ledge 122 rather than being retained thereby as occurs when the flange 118 contacts the ledge.

It will be understood that the design of the part being transported by the belt 76 will determine the type of cutout portion to be provided in the rail 50 to realize the above explained separation of the improperly oriented parts from those that are properly positioned. It will also be understood that, although not shown, a turnover device can be located below the cutout portion 54 so as to cause the parts 114 dropping back onto the floor portion to be turned over and to properly be positioned on their flange 120 prior to refeeding onto the belt 76.

From the above description, it should be apparent that the parts 114 that are properly oriented on the belt 76, will be moved by the belt 76 towards the exit point 42 of the bowl 12 and then along the straight section of the extension device 56. When the part 114 reaches the roller 70, it is then transferred to another station by "pick off" apparatus (not shown) for assembly with the oil filter element.

Various changes and modifications can be made in this construction without departing from the spirit of the invention. Such changes and modifications are contemplated by the inventor and he does not wish to be limited except by the scope of the appended claims.

What is claimed is:

1. A material handling apparatus for transporting parts, said apparatus comprising a bowl having an upright curved wall circumferentially surrounding a rotatable floor, said curved wall having an entrance point for said parts located at substantially the same elevation as said floor and an exit point for said parts located at an elevation higher than said floor, an endless belt having an inner edge and an outer edge, said belt being composed of a plurality of links collapsibly interconnected to allow the belt to bend in an edgewise direction, a track formed along the concave surface of said wall for supporting said belt for helical movement from said entrance point to said exit point, means extending radially outwardly in a curved form from the center of the bowl towards the outer edge of the floor and being normally positioned adjacent said entrance point for cooperation with said rotatable floor for feeding said parts onto said belt at said entrance point, said track having an outer edge located adjacent said wall and an inner edge, an upstanding rail connected to said inner edge of said track and being engaged by and serving as a support for said inner edge of said belt, a portion of said track being inclined radially downwardly towards the center of said bowl so as to cause the parts carried by said belt to move by gravity towards said rail and engage the rail as the parts are moved from said entrance point to said exit point, and an opening formed in said rail along said portion of said track for causing improperly oriented parts to drop by gravity to said rotatable floor so as to be fed once again onto said belt at said entrance point.

2. A material handling apparatus for transporting parts, said apparatus comprising a bowl having an upright curved wall, a disc-shaped floor that is conically shaped in cross section supported in said bowl for rotation about a vertical axis, said curved wall circumferentially surrounding said floor and having an entrance point for said parts located at substantially the same elevation as said floor and an exit point for said parts located at an elevation higher than said floor and above said entrance point, means for rotating said floor about said vertical axis, an endless belt having an inner edge and an outer edge and being composed of a plurality of metal links collapsibly interconnected to allow the belt to bend in an edgewise direction, a planar track formed along the concave surface of said wall for supporting the lower portion of said belt for helical movement from said entrance point to said exit point, a thin flexible sweep member carried by said wall and extending radially outwardly in a curved form from the center of the bowl towards the outer edge of the floor and being normally positioned adjacent said entrance point for cooperation with said rotatable floor for feeding said parts onto said belt at said entrance point, means for moving said belt along said track, said track having an outer edge located adjacent said wall and an inner edge, an upstanding rail connected to said inner edge of said track and being engaged by and serving as a support for said inner edge of said belt, a portion of said track being inclined radially downwardly towards the center of said bowl at an angle that causes the parts carried by said belt to move by gravity towards said rail and engage the rail as the parts are moved by said belt from said entrance point to said exit point, and an opening formed in said rail along said portion of said track for causing improperly oriented parts to drop by gravity to said rotatable floor so as to be fed once again onto said belt at said entrance point.

* * * * *